(12) United States Patent
Wang et al.

(10) Patent No.: US 9,087,221 B2
(45) Date of Patent: Jul. 21, 2015

(54) DEVICE FOR PREVENTING LOGGING OF CLIENTS INPUT DATA IN A COMPUTER SYSTEM

(71) Applicants: Chi-Pei Wang, Hsinchu (TW); Chen Chang, Hsinchu (TW); Kai-Hsiang Chou, Hsinchu (TW)

(72) Inventors: Chi-Pei Wang, Hsinchu (TW); Chen Chang, Hsinchu (TW); Kai-Hsiang Chou, Hsinchu (TW)

(73) Assignee: OTHE TECHNOLOGY INC., Hsinchu (TW)

( * ) Notice: Subject to any disclaimer, the term of this patent is extended or adjusted under 35 U.S.C. 154(b) by 0 days.

(21) Appl. No.: 14/150,039

(22) Filed: Jan. 8, 2014

(65) Prior Publication Data

US 2014/0215204 A1    Jul. 31, 2014

(30) Foreign Application Priority Data

Jan. 30, 2013   (TW) .............................. 102201971 U

(51) Int. Cl.
*H04L 9/00* (2006.01)
*G06F 21/83* (2013.01)
(52) U.S. Cl.
CPC ...................................... *G06F 21/83* (2013.01)

(58) Field of Classification Search
CPC ..... G06F 21/83; H04L 63/0428; H04L 29/06; H04L 63/0823; H04L 63/08; H04L 63/0442
USPC .................................................. 713/153, 189
See application file for complete search history.

(56) References Cited

U.S. PATENT DOCUMENTS

| 7,835,521 B1 * | 11/2010 | Pinheiro | 380/239 |
| 2009/0144558 A1 * | 6/2009 | Wang | 713/189 |
| 2010/0131764 A1 * | 5/2010 | Goh | 713/171 |

* cited by examiner

*Primary Examiner* — Baotran N To
(74) *Attorney, Agent, or Firm* — Egbert Law Offices, PLLC

(57) ABSTRACT

A device for preventing logging of client input data in a computer system, characterized in that it includes a first transmission interface used to connect the smart electronic device, a second transmission interface used to connect the computer system, and a data encryption chip for encryption of the input data. The data encryption chip is set between the first and second transmission interfaces and is used to encrypt data input from the first transmission interface, and then transmit the encrypted data to the computer system via the second transmission interface. The device allows for the use of a smart electronic device as a real keyboard, and the computer system permits the data encryption chip to encrypt the data input by the smart electronic device, which are then sent to the computer system, helping to prevent logging of keying data with higher efficacy and applicability.

1 Claim, 3 Drawing Sheets

DEVICE FOR PREVENTING LOGGING OF CLIENTS INPUT DATA IN A COMPUTER SYSTEM

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a device designed to prevent logging of clients' input data in a computer system.

2. Description of Related Art Including Information Disclosed Under 37 CFR 1.97 and 37 CFR 1.98

The keyboard data of a personal computer (PC) is implemented by IO instructions of CPU and keyboard controller IO ports 60h,64h (h represents hex digits).

Given the primitive framework of a PC, any type of software could be used to acquire the keying data without being noticed by the client. The keylogger or spy software may illegally steal personal accounts and passwords using such a characteristic.

INTEL, the world's biggest CPU manufacturer, developed and marketed TMKBC (Trusted Mobile Keyboard Controller) a few years ago. TMKBC is mainly introduced into high-level notebook computers, but its framework must be loaded with a complete set of specific computer chips (LaGrande Platform), comprising: Trusted CPU, Trusted Chipset, Trusted Memory, Trusted Graphics, Trusted Platform Module (TPM) and TMKBC. As it is hard to compatibly incorporate such a complex system into an existing software/hardware system with higher production cost, this system is no longer promoted by Intel. The objective of TMKBC is to prevent hijacking against the clients' keyboard, but no encryption/decryption technologies or methods are contained in the specifications. Besides, the anti-logging technology is established based on the trustworthy platform (LaGrande Platform) without allowing reading or modifying of the keyboard data by any program.

In the absence of encrypted keyboards in the previous market, the on-line treasures or scores of game players are often stolen, or these players may face loss of money due to logging of accounts and passwords of Internet banks.

Though some encryption keyboards with anti-logging functions have already been developed, such encryption keyboards are designed in a manner that the encryption function is limited to the keyboard structure. Namely, when said encryption keyboard is not set in the operating environment, the encryption function cannot be implemented. Hence, a breakthrough progress is urgently required to develop anti-logging computer system of other patterns, and deliver multiple options for the clients to meet their diversified operating demands and pertinence.

BRIEF SUMMARY OF THE INVENTION

The device of the present invention for preventing logging of client input data in a computer system is an innovative device connected with an existing smart electronic device and a computer system, and is mainly composed of a first transmission interface, a second transmission interface and a data encryption chip. As compared with prior art, the present invention allows for the use of a smart electronic device as a real keyboard. Also, the computer system permits the data encryption chip to encrypt the data input by the smart electronic device, which are then sent to the computer system via the second transmission interface, helping to prevent logging of keying data.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

Figure 1:
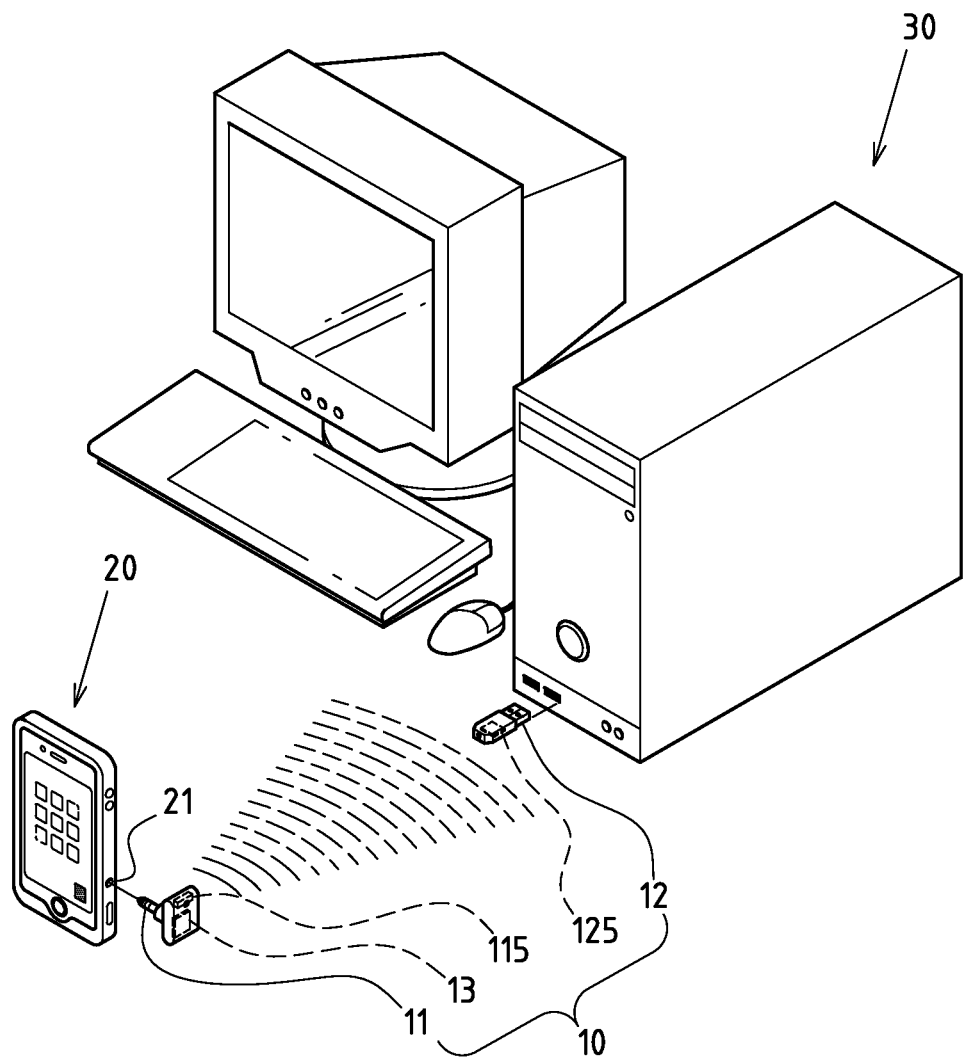
FIG. 1 is a perspective view of the preferred embodiment of the device of the present invention.
Figure 2:
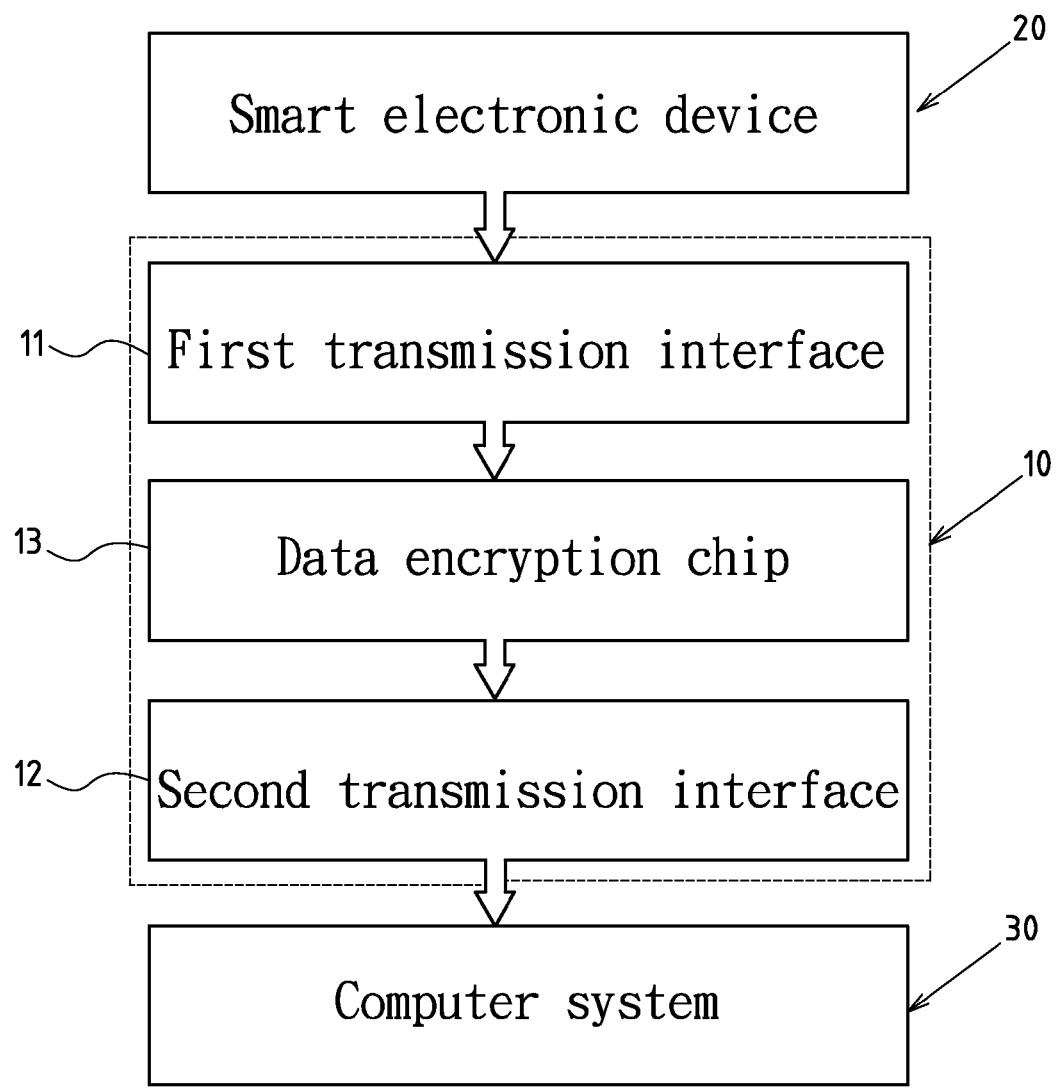
FIG. 2 is a textual block chart of the preferred embodiment of the present invention showing the relationship among components of the device.
Figure 3:
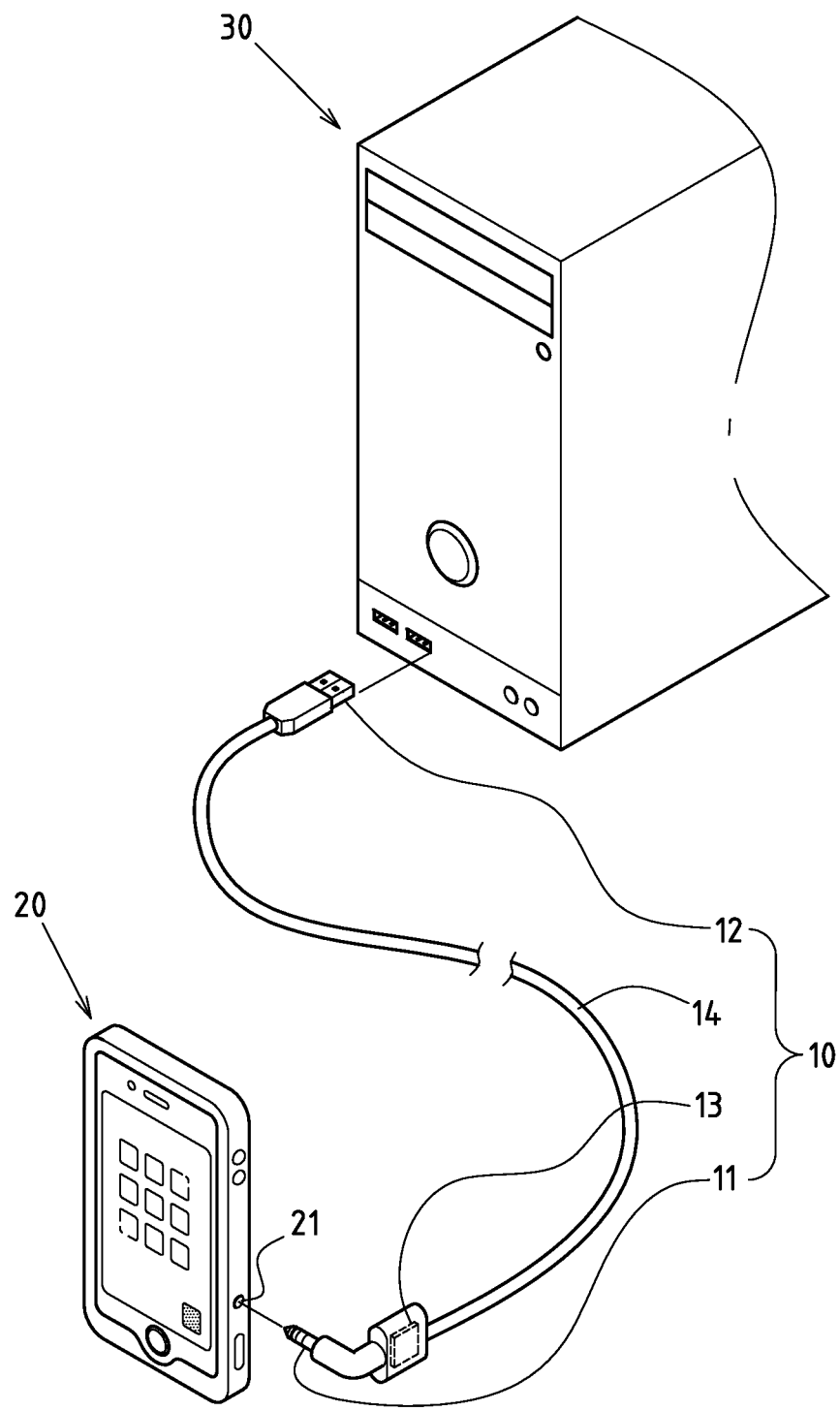
FIG. 3 is a schematic view of the preferred embodiment of the present invention showing wired transmission of the first and second transmission interfaces.

FIG. 1-3 depict preferred embodiments of a device of the present invention for preventing logging of client input data in the computer system, which, however, are provided for only explanatory objective for patent claims. Said device 10 is used for preventing logging of client input data in a computer system and is used to connect with an existing smart electronic device 20 and a computer system 30.

The device 10 includes a first transmission interface 11, used to connect the smart electronic device 20.

A second transmission interface 12 is used to connect the computer system 30.

A data encryption chip 13 is provided for encryption of the client input data, and is set between the first transmission interface 11 and second transmission interface 12. Said data encryption chip 13 is used to encrypt data input from the first transmission interface 11, and then transmit the encrypted data to the computer system 30 via the second transmission interface 12.

Referring to FIG. 1, the signals between the first transmission interface 11 and second transmission interface 12 are transmitted wirelessly, namely, the first transmission interface 11 is provided with a wireless transmitter 115, and the second transmission interface 12 is provided with a wireless receiver 125.

Referring to FIG. 3, the signals between the first transmission interface 11 and second transmission interface 12 are transmitted wiredly, namely, the first transmission interface 11 and second transmission interface 12 are connected via a transmission line 14.

Of which, said smart electronic device 20 comprises of a smart mobile phone and tablet PC.

Based upon the above-specified structural design, the core design of the device 10 of the present invention mainly lies in the technical characteristics of the first transmission interface 11, second transmission interface 12 and data encryption chip 13. Referring to FIG. 1, the device 10 allows the clients to connect the first transmission interface 11 with its audio port 21 (or USB port) on said smart electronic device 20 (e.g.: a smart mobile phone and tablet PC), realizing ease-of-operation (note: currently the smart electronic devices are commonly used), and then connect the second transmission interface 12 of the device 10 with the computer system 30. After encryption by the data encryption chip 13 of the device 10, the data input by the clients' smart electronic device 20, comprising accounts, passwords and other data, are protected properly. With this design, the clients do not worry about exposure of accounts and confidential data or loss of money when utilizing Internet banks, on-line shopping websites, auctions and on-line game websites, helping to realize anti-logging of input data with higher efficacy and applicability. Moreover, the device 10 also provides the clients with a novel data encryption model, which can be set into a wireless or wired compact pattern, ensuring easier operation and higher convenience to meet various demands and pertinence with multiple options.

Although the invention has been explained in relation to its preferred embodiment, it is to be understood that many other possible modifications and variations can be made without departing from the spirit and scope of the invention as hereinafter claimed.

We claim:

1. A device for preventing logging of input data of a client in a computer system, the device comprising:
   a smart electronic device;
   a first transmission interface connected to the smart electronic device;
   a second transmission interface adapted to be connected to the computer system; and
   a data encryption chip adapted to encrypt the input data, said data encryption chip arranged between said first and second transmission interfaces, said data encryption chip encrypting data input from said first transmission interface, said second transmission interface transmitting the encryption data to the computer system, said smart electronic device operating as a real keyboard, the computer system permitting said data encryption chip to encrypt the data input by said smart electronic device which is then sent to the computer system by said second transmission interface so as to prevent logging of keying data, said first and second transmission interfaces producing wireless signals therebetween, said first transmission interface having a wireless transmitter, said second transmission interface having a wireless receiver, said smart electronic device selected from the group consisting of a smart mobile phone and a tablet personal computer.

* * * * *